United States Patent Office 3,479,349
Patented Nov. 18, 1969

3,479,349
POLYSULFONATED BIS-S-TRIAZINYLAMINO-
STILBENE-2,2'-DISULFONIC ACIDS
Robert Corwin Allison, Yonkers, N.Y., and Franz Fischer,
Basel, and Heinrich Hausermann, Riehen, Switzerland,
assignors to Geigy Chemical Corporation, Ardsley,
N.Y., a corporation of New York
No Drawing. Filed Aug. 3, 1967, Ser. No. 658,019
Int. Cl. C09b 23/00
U.S. Cl. 260—240                              11 Claims

ABSTRACT OF THE DISCLOSURE

New polysulfonated bis-s-triazinylamino-stilbene-2,2'-disulfonic acids and their salts, in the molecules of which each triazine ring is substituted at a first ring carbon atom by disulfophenyl-amino, and at a second ring carbon atom by a substituted amino group the substituents of which are free from sulfonic acid radicals; these compounds are useful especially as brighteners in the surface coating of paper, imparting high white maxima thereto; paper surface-coated with coating mixtures containing such novel compounds, a method for optical brightening of cellulosic fibers, especially cotton, by continuous pad dyeing type processes with or without the use of precondensates for wash-and-wear resin finish in the pad liquor; and compositions containing such compounds, for use in the above brightening methods.

DESCRIPTION OF THE INVENTION

The present invention concerns new, polysulfonated bis-s-triazinylamino-stilbene-2,2'-disulfonic acids and their salts, the production thereof and their use for the optical brightening of cellulose substrates.

It is well known that substrates containing cellulose and polyamide can be optically brightened with bis-s-triazinylamino-stilbene-2,2'-disulfonic acids. Also, very numerous variations in the triazine substituents have been tried out in order to modify the properties of this class of optical brighteners so that they will be able to meet all demands on application. It is, therefore, all the more surprising that, in spite of the great and varied work already done in this fiield, it is still possible to find new and valuable optical brighteners which have unexpected advantages over the known bis-s-triazinylamino-stilbene-2,2'-disulfonic acids.

The vast majority of the known bis-s-triazinylamino-stilbene type brighteners which possess a phenylamino substituent in each of the s-triazinyl rings have a total of from two to four sulfonic acid groups per molecule, two of which are always linked to the central stilbene portion of the molecule, while of the two others, if the total number is four, one is linked to each of the phenyl-amino substituents of the s-triazinyl rings.

Certain bis-(phenylamino - s - triazinylamino)-stilbenes which have a total of six to eight sulfonic acid groups per molecule, have good solubility in acidic medium even at a pH below 2, and are usable as optical brighteners in combination with cationic synthetic detergents on cellulosic textile fibers, and also in paper making in combination with rosin or alum sizes.

However, those of the last-mentioned higher sulfonated optical brighteners which possess triazinyl moieties of the formula:

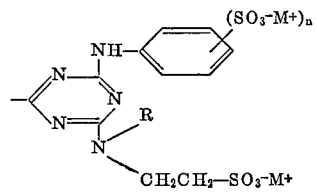

wherein:

R represents hydrogen or lower alkyl,
M+ represents hydrogen or alkali metal cation, and
n represents 1 or 2, which have a good acid solubility, fail to produce satisfactory whitening effects especially neutral white maxima (without tendency to shift to greenish or greyish hues), when applied in the surface coating of paper.

The use of optical brighteners in the paper industry has steadily increased in importance. While optical brighteners were originally applied mainly in the pulp in the beater, nowadays, application in surface coatings in combination with surface sizes, white pigments or the like, or by treatment of the paper with aqueous solutions of the optical brightener per se, has become the more important procedure.

"Surface coating" of paper as used in this specification refers to all those operations in paper making that are concerned with the after-treatment of a formed paper by coating and/or similar treatments, for instance in a sizing press.

It is a principal object of the present invention to provide optical brighteners which are particularly effective in the surface coating of papers imparting to the finished paper products maximal neutral white effects; while preferably being useful at the same time for a variety of other methods of optical brightening.

This and other objects, which will be apparent from the decription of the invention further below, are attained by the novel polysulfonated bis-s-triazinylamino-stilbenes of the formula:

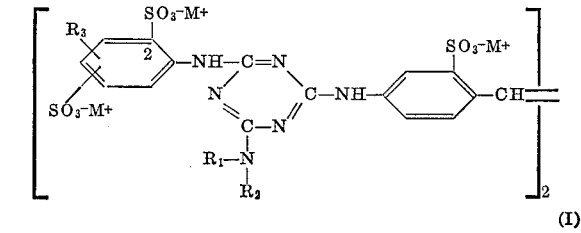

(I)

wherein:

R₁ represents hydrogen, an alkyl, alkoxyalkyl or alkyl-aminoalkyl radical optionally substituted by hydroxyl or alkoxy groups, a cycloalkyl radical optionally substituted by lower alkyl groups, or a phenyl radical optionally substituted by lower alkyl, by lower alkoxy groups or by halogen atoms up to the atomic number 35,
R₂ represents hydrogen or an alkyl or alkoxyalkyl radical optionally substituted by hydroxyl or alkoxy groups, and
R₁ and R₂ together with the nitrogen atom to which they are linked and, optionally, with the inclusion of oxygen as a ring member, represent a non-aromatic heterocycle, R₃ represents hydrogen, lower alkyl groups or halogen up to the atomic number 35, and M⁺ represents a cation selected from hydrogen, alkali metal, alkaline earth metal, optionally substituted ammonium or aluminum.

By salts falling under Formula I are meant, in particular, alkali metal salts, preferably the sodium or potassium salt, also alkaline earth metal salts such as the calcium or magnesium salt; ammonium salts such as those which are derived from ammonia or from nitrogen bases such as mono-, di- and tri-alkanolamines, particularly hydroxy-lower alkylamines, and, finally, the aluminum salt.

Alkyl and alkoxy groups in the above definitions are preferably lower alkyl or alkoxy groups of at most 6 carbon atoms; alkoxyalkyl and alkylaminoalkyl groups have a total of preferably at least 3 and not more than 8 carbon atoms. Cycloalkyl groups have preferably from 5 to 6 carbon atoms in the ring. The total of carbon atoms in lower alkyl substituted cycloalkyl groups should be at least 6, and preferably not exceed 12 carbon atoms. If not otherwise defined, "lower" in connetcion with alkyl or alkoxy radicals means that such radicals have not more than 4 carbon atoms. Alkoxyalkoxyalkyl radicals have preferably a total of at least 5 and not more than 10 carbon atoms.

Non-aromatic heterocyclic substituents as defined above are preferably pyrrolidino, piperidino, hexamethyleneimino or morpholino and the lower alkyl-substituted derivatives there wherein the alkyl substitution has a total of at most 3 carbon atoms. Among the halogen substituents in the definition of R₃, chlorine is preferred because of the good water-solubility of the corresponding compounds.

Preferred compounds, which fall under the formula:

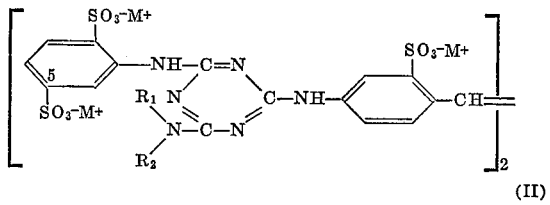

(II)

and wherein R₁, R₂ and M⁺ have the preferred meanings as given following Formula I, afford particularly high maxima of neutral white in surface coated papers. Optimal results in this mode of application are obtained with those compounds of Formula II in which each of R₁ and R₂ inedpendently represents hydrogen or a lower alkyl or lower alkoxyalkyl radical optionally substituted by hydroxyl or lower alkoxy groups, or wherein R₁ and R₂ together with the nitrogen and, optionally, with the inclusion of oxygen, represent a non-aromatic heterocycle as defined as preferred following Formula I.

In the most important field of application, namely the surface coating of paper, the optical brighteners of Formula I are applied, for example, in such operations as:

(I) surface sizing, in combination with (a) aqueous non-aging binder preparations comprising, especially, degraded starch, gelatin, alkali metal alginates, casein, hide glue, protein, especially soybean protein, hydroxyethyl cellulose, carboxymethyl cellulose, polyvinyl alcohol or polyvinyl pyrrolidone, or mixtures of these binders with each other.

(b) aqueous, thermally cross-linkable latices of acrylic polymers or copolymers, e.g. copolymers of methyl acrylate/methyl methacrylate or each of these or both with polyacrylonitrile or styrene, or 50—50 copolymer of butadiene and styrene; and (II) surface-coating, in combination with white pigment such as clay, especially China clay, talc, ground limestone, barite, titanium dioxide, satin white

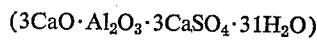

precipitated chalk, blanc fixe, or mixtures of such pigments and with substances defined under (a) and/or (b), supra.

It is now possible both to finish the surface and optically brighten crude paper simultaneously by these processes using treatment liquors containing 0.05-1% of optical brighteners of Formula I. Often crude papers have a low pH due to their content of aluminum salts. It is therefore another advantage of the brighteners according to the invention that the brightening effect attained is quite independent of the pH and alkali content of the paper; this is quite contrary to numerous known optical brighteners which show great discolorations on paper having an acid reaction.

"Crude papers" which are to be subjected to surface coating methods described herein, are fully formed papers on cellulose fiber basis, e.g. sulfite cellulose basis, which have been sized in the beater and which are either free from fillers or, optionally have been filled with such white pigment fillers as China clay, kaolin, small amounts of barium sulfate and the like. Surface coating methods as described above may thus, in the latter case, add a second pigment to the surface of the paper.

The brightening of crude paper by surface coating can also be performed without the use of finishing agents other than the optical brightener. In this case, the crude paper is treated at room temperature with a 0.05-1% aqueous brightener solution and then dried in the usual way. Because of their relatively low substantivity on cellulosic fibers, the compounds according to the invention are particularly suitable for this mode of application as their content in the treatment bath does not substantially decrease during the treatment and, therefore, there is no gradually diminishing brightening effect in the treated substrate.

When performing the surface-coating of crude paper in practice, the following types of coating compositions are particularly recommended:

(A) about 0.05 to 0.6% of optical brightener of Formula I, about 2 to 15% of non-aging paper-coating binder, the balance consisting of water;

(B) about 0.05 to 0.6% of optical brightener of Formula I, about 2 to 15% of thermally cross-linkable copolymer paper-coating binder, which binder is usually applied in the form of a latex having a 50% solids content, the balance consisting of water;

(C) about 0.05 to 0.6% of optical brightener of Formula I, 10 to 65% of white pigment, 5 to 25% of non-aging paper-coating binder or of thermally cross-linkable copolymer paper-coating binder, the balance consisting of water.

All percentages given in the above compositions (A) to (C) except the solids content mentioned under (B) are by weight calculated on the total weight of the respective composition. The solids content is calculated on the total weight of the latex.

In addition, the coating liquors can also contain water-soluble poly- or meta-phosphates as well as wetting agents, e.g. unsulfated or sulfated higher alkanol or alkylphenol polyglycol ethers having 8 to 14 carbon atoms and 1 to 20 ethylene oxide groups.

In case good flowing properties are of importance, alkaline pigment coating liquors are preferred. The alkaline reaction of the liquors is advantageously obtained with ammonium hydroxide or with sodium or potassium hydroxides, carbonates, borates, perborates or mixtures thereof.

Paper is coated with liquors (A), (B) or (C) in conventional coating machines. Papers are thus obtained which, in addition to an improved surface, also have a more pleasant, whiter appearance.

In the form of their sodium or potassium salts, the new optical brighteners are colorless to slightly yellowish powders which dissolve sufficiently well in water to produce 10 to 25% liquid preparations, (so-called "liquid brighteners"). The dilute aqueous solutions, i.e. treatment baths which contain 0.01 to 10 g. of optical brightener per liter, even remain stable at a low pH of 1 to 2 and, on cellulose and polyamide substrates such as cotton, staple fiber, rayon, viscose films, so-called "non-woven fabrics," paper, and nylon, they produce good, neutral white or slightly violet-tinged brightening effects which, even when relatively high concentrations are used, have no tendency to turn greenish.

The optical brighteners of Formula I can also be used for the following other purposes:

Cellulose textile brightening by the exhaustion method (large liquor-to-goods ratio); cellulose textile brightening by the continuous method used e.g. in pad dyeing; cellulose textile brightening in a synthetic resin bath; brightening of nylon from an acid bath at 90 to 100° C.; application to the spinning mass in the production of viscose rayon; application in the washing bath for cellulose, by incorporation into soaps and detergents; application in rinsing baths together with textile softeners; or brightening of paper in the pulp.

Cellulose fibers are brightened in a long bath, i.e. at a liquor ratio of 1:10 to 1:50, by using e.g. 0.01 to 0.25 g. of optical brightener and 2 g. of Glaubers salt per liter, a temperature of 30 to 60° C. and a duration of 15 to 30 minutes.

In the pad dyeing process, e.g. 1 to 10 g. of optical brightener are used per liter at room temperature. The goods are squeezed out to 50 to 100% liquor content and then dried.

When the optical brighteners are applied from a bath which contains synthetic resin precondensates, e.g. dimethylol hydroxyalkylene ureas, and acid catalysts, e.g. hydrochloric acid and oxalic acid, the concentrations of brightener given above for the pad dyeing process are used. Fabrics treated in such a bath are then heat treated.

When the compounds of Formula I are incorporated into soaps and detergents, these contain e.g. 0.05 to 0.5% of optical brightener. Advantageously, additional cellulose brighteners having greater substantivity are also incorporated. Examples thereof are: the disodium salts of 4,4' - bis - [2,4 - dianilino - s - triazinyl - (6) - amino] - stilbene-2,2'-disulfonic acid, 4,4'-bis-[2-(3-methoxypropylamino) - 4 - anilino - s - triazinyl - (6) - amino] - stilbene-2,2'-disulfonic acid, 4,4'-bis-[2-morpholino - 4 - anilino-s-triazinyl-(6)-amino]-stilbene-2,2'-disulfonic acid or 4,4'-bis-[2-(N-methyl-ethanolamino) - 4 - anilino - s - triazinyl-(6)-amino]-stilbene-2,2'-disulfonic acid. With these combinations, a high brightening effect is not only attained in the first washing process but the presence of the brighteners according to the invention ensures that by repeated use of the washing liquor the celluose substrates are also brightened in the following washing cycles.

Polyamide fibers are optically brightened, for example, with 0.02 to 0.16 g. of brightener and 1 to 10 g. of formic acid per liter at a liquor ratio of 1:30, a temperature of 90 to 98° and a treatment time of 30 minutes.

In the above modes of application, the new optical brighteners have the following advantages over known products of similar constitution:

(1) By the surface brightening of paper, the brightener concentration of the aqueous solution remains constant and the brightening effect is thus not diminished.

(2) In the surface coating process, the new stilbene compounds are very compatible with the binders and white pigments used.

(3) The new stilbene compounds have good stability in strongly acid textile treatment baths which contain precondensates, e.g. cyclic N-methylol compounds for the anticrease processing of cotton by the so-called "moist cross-linking process."

(4) In the brightening of cotton by the pad dyeing process, the new optical brighteners quickly develop a white effect without a special after-treatment, such as storage of the goods while still moist, steam treatment or treatment with a hot aqueous polyphosphae solution, being necessary.

(5) The new stilbene derivatives draw slowly from the washing bath. This enables repeated use of the same liquor which is, particularly in low temperature washing processes, of great economic importance.

(6) The new stilbene compounds do not undesirably discolor soaps and detergents.

The compounds of Formula I are produced by reacting two mol of an aniline disulfonic acid of the general formula

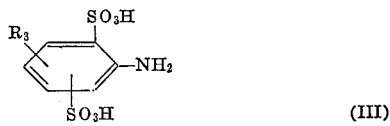

(III)

or its salts, in which formula $R_3$ is hydrogen, lower alkyl or halogen up to the atomic number 35, first with 2 mol of cyanuric chloride, then with 1 mol of 4,4'-diaminostilbene-2,2'-disulfonic acid or its salts and, finally, with 2 mol of an amine of the formula

(IV)

wherein $R_1$ and $R_2$ have the same meanings as in Formula I, the reaction being performed in an aqueous medium and in the presence of acid binding agents.

The first step of the reaction is performed, preferably, at temperatures below 10° C., the second is performed at 0 to 30° C. and the last step is performed at 50 to 100° C. For the first two steps of the reaction, chiefly alkali carbonates, bicarbonates, hydroxides or acetates are used as acid binding agents while in the third step, in addition to alkali carbonates and hydroxides, preferably an excess of base of Formula IV is useful for this purpose. If the amine of Formula IV is a primary or secondary aromatic amine such as aniline, then the third step of the reaction is preferably performed in a weakly acid pH range. The reaction can be performed both in a purely aqueous medium as well as in a mixture of water and organic solvents which are hydrophilic to the reaction components. Such solvents are, mainly, low molecular ketones such as acetone or methylethyl ketone.

The very easily water-soluble end products of Formula I are precipitated from their aqueous solutions, preferably, by salting out e.g. with alkali chlorides, and they can be easily filtered off. They can also be recovered by evaporating the reaction solutions to dryness in vacuo. However, by the latter method, less pure products are obtained.

Chiefly 1-aminobenzene-2,4-disulfonic acid and 1-aminobenzene-2,5-disulfonic acid are meant by aniline disulfonic acids of Formula III; the latter is preferred. Examples of amines of Formula IV are: ammonia, aliphatic amines such as methylamine, ethylamine, propylamine, butylamine, hexylamine, dimethylamine, diethylamine, dipropylamine, monoethanolamine, isopropanolamine, N,N-bis-($\beta$ - hydroxyethyl) - propylenediamine, 3-methoxy-propylamine, 2-($\beta$-hydroxyethoxy)-ethylamine, N-methyl-monoethanolamine, diethanolamine, di-isopropanolamine; aromatic amines such as aniline, m-chloraniline, m-anisidine and m-toluidine; hydrogenated heterocyclic amines such as pyrrolidine, piperidine, morpholine, 2-monomethyl- and 2,6-dimethylmorpholine and hexamethyleneimine. Most preferred amines are methylamine, dimethylamine, ethylamine, diethylamine, propylamine, isopropanolamine, di-isopropanolamine, pyrrolidine, piperidine, morpholine and hexamethyleneimine.

The following non-limitative examples illustrate the invention further. In these examples temperatures are in degrees centigrade and percentages are given by weight unless expressly stated otherwise.

amines given in the following Table I and the end products are recovered by the methods given in column 3. All products are only very slightly colored, easily water-soluble powders.

EXAMPLE 1

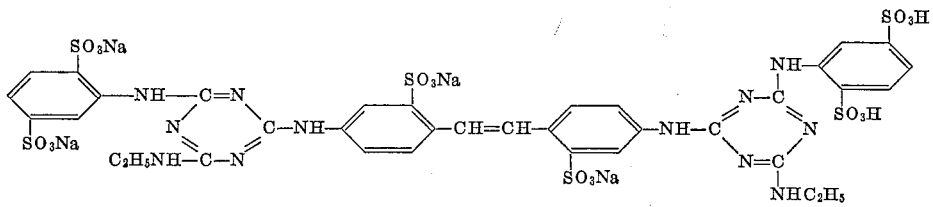

77.5 g. of cyanuric chloride are dissolved in 300 g. of acetone and the solution is added to 2,000 g. of ice water while stirring. A solution of 125 g. of 1-amino-benzene-2,5-disulfonic acid sodium salt in 700 ml. of water is poured into the cyanuric chloride suspension obtained, the addition being made within 30 minutes at −5 to +5°, and the acid liberated is neutralized with a 15% sodium carbonate solution so that the pH of the mixture remains at 3–4. The mixture is then stirred for 4 hours at 0–5° and pH 3–4. 82.8 g. of the sodium salt of 4,4′-diaminostilbene-2,2′-disulfonic acid in 600 ml. of water are then added to the clear reaction solution, the pH is kept at 7 with sodium carbonate solution and the mixture is stirred for 4 hours at 20–30°. At the end of this time the clear reaction solution contains practically no diazotizable amine. Ethylamine is then added to the solution of hexasodium 4,4′-bis-[2-chloro-4-(2,5-disulfophenylamino)-s-triazinyl-(6)-amino] - stilbene-2,2′ - disulfonate formed, until the pH rises to 9–10. This pH is maintained by successive additions of further amounts of ethylamine while the whole is heated at 90 to 93° for 90 minutes. After the addition of 400 g. of sodium chloride, the suspension is cooled, the hexasodium 4,4′-bis-[2-ethylamino-4-(2,5-disulfophenylamino) - s - triazinyl-(6)-amino]-stilbene-2,2′-disulfonate, is filtered off and dried at 80° in vacuo. The new optical brightener is an almost colorless, easily water-soluble powder. The 1% aqueous solution has an intensive blue fluorescence and does not become opaque on the addition of excess concentrated hydrochloric acid. The product can be used for the optical brightening of cellulose substrates such as paper, cotton, regenerated cellulose substrates, or products made of polyamide fibers. The resulting dyeings are distinguished by a high neutral-white maximum.

Compounds having similar effects are obtained if in the above example, the ethylamine is replaced by the

TABLE I

| Ex. | Amine | Method of recovery |
|---|---|---|
| 2 | Methylamine | Salting out with NaCl. |
| 3 | Dimethylamine | Salting out with KCl. |
| 4 | Diethylamine | Salting out with NaCl. |
| 5 | n-Propylamine | Do. |
| 6 | Di-n-propylamine | Salting out with KCl. |
| 7 | Isopropanolamine | Salting out with NaCl. |
| 8 | Di-isopropanolamine | Evaporation in vacuo. |
| 9 | 2-methoxyethylamine | Salting out with NaCl. |
| 10 | 3-methoxypropylamine | Evaporation in vacuo. |
| 11 | 2-(2′-hydroxyethoxy)-ethylamine | Salting out with KCl. |
| 12 | N-methyl-monoethanolamine | Do. |
| 13 | N-ethyl-monoethanolamine | Salting out with NaCl. |
| 14 | N-ethyl-2,3-dihydroxypropylamine | Do. |
| 15 | n-Butylamine | Do. |
| 16 | Pyrrolidine | Do. |
| 17 | Piperidine | Do. |
| 18 | Morpholine | Do. |
| 19 | Diethanolamine | Evaporation in vacuo. |
| 20 | Monoethanolamine | Salting out with NaCl. |
| 21 | n-Hexylamine | Do. |
| 22 | 2,6-dimethylmorpholine | Evaporation in vacuo. |
| 23 | Hexamethyleneimine | Salting out with NaCl. |
| 24 | 2-methylmorpholine | Do. |
| 25 | Ammonia | Do. |
| 26 | N,N-bis-(2-hydroxyethyl)-1,3-propylenediamine | Evaporation in vacuo. |
| 27 | N-methylethylamine | Salting out with NaCl. |

EXAMPLE 28

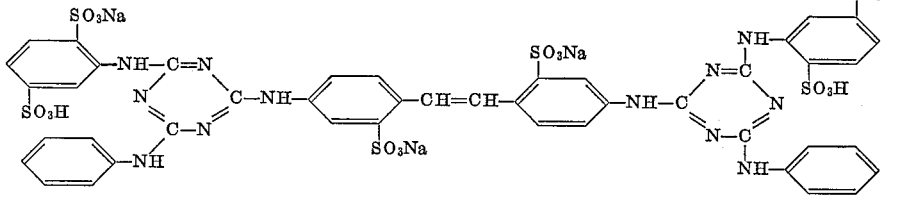

37.2 g. of aniline are added to a solution produced according to Example 1 containing 220 g. of hexasodium 4,4′ - bis-[2-chloro-4-(2,5-disulfophenylamino)-s-triazinyl-(6) - amino] - stilbene-2,2′-disulfonate, and the whole is heated at 90–95° for 6 hours. The solution formed, which has a strongly acid reaction, is then neutralized with sodium carbonate and the compound obtained is salted out with 600 g. of sodium chloride in the form of the hexasodium salt. After drying, the new optical brightener is a pale yellowish powder which dissolves well in water. The product has very good stability to acid and can be used for the brightening of cotton from strongly acid textile treatment liquors containing synthetic resin precondensates.

Equally effective products are obtained by replacing the aniline in this example by equivalent amounts of the following amines: 2-methylaniline, 3-methylaniline, 3,4-dimethylaniline, 3-chloraniline or 3-methoxyaniline.

EXAMPLE 29

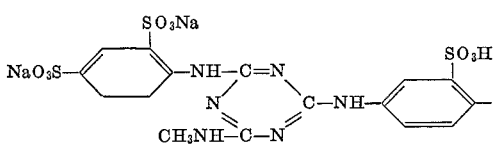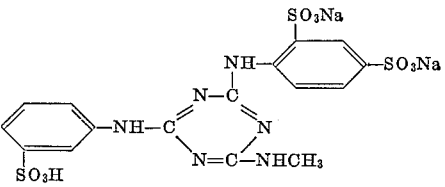

Example 1 is repeated but the 125 g. of sodium 1-aminobenzene-2,5-disulfonate are replaced by 125 g. of sodium 1-aminobenzene-2,4-disulfonate and the ethylamine is replaced by an aqueous methylamine solution, whereupon, with otherwise the same procedure, hexasodium 4,4'-bis-[2 - methylamino - 4-(2,4-disulfophenylamino)-s-triazinyl-(6)-amino]-stilbene-2,2'-disulfonate is obtained. It is recovered by salting out with sodium chloride in the form of a yellowish powder. This optical brightener can be used for the optical brightening of cellulose substrates such as paper or cotton.

The stilbene compounds given in the following Table II can be produced in an analogous way:

TABLE II

| Ex. | Stilbene Compound | Method of Recovery |
| --- | --- | --- |
| 30 | 4,4'-bis-[2-(2-hydroxypropylamino)-4-(2,4-disulfophenylamino(-s-triazinyl-(6)-amino]-stilbene-2,2'-disulfonic acid, hexapotassium salt. | Salting out with KCl. |
| 31 | 4,4'-bis-[2-(n-butylamino)-4-(2,4-disulfophenylamino)-s-triazinyl-(6)-amino]-stilbene-2,2'-disulfonic acid, hexapotassium salt. | Do. |
| 32 | 4,4'-bis-[2-(2-hydroxyethoxy)-ethyl-amino-4-(2,4-disulfophenylamino)-s-triazinyl-(6)-amino]-stilbene-2,2'-disulfonic acid, hexasodium salt. | Evaporation in vacuo. |
| 33 | 4,4'-bis-[2-ethylamino-4-(3-chloro-2,5-disulfophenylamino)-s-triazinyl-(6)-amino]-stilbene-2,2'-disulfonic acid, hexasodium salt. | Salting out with NaCl. |
| 34 | 4,4'-bis-[2-ethylamino-4-(4-methyl-2,5-disulfophenylamino)-s-triazinyl-(6)-amino]-stilbene-2,2'-disulfonic acid, hexasodium salt. | Do. |

EXAMPLE 35

80 g. of corn starch α-amylase-degraded with heating to the gelatinization point (about 70°) until the viscosity of the starch is about 32 centipoise (measured with an aqueous 10%-degraded starch solution in a Höppler falling ball viscosimeter), e.g. Noredux 100, are dissolved in 1000 ml. of 90° hot water.

After 15 minutes, a colloidal solution is formed which is then mixed with a solution of 2 g. of hexasodium 4,4'-bis - [2 - ethylamino - 4 - (2,5 - disulfophenylamino)-s-triazinyl-(6)-amino]-stilbene-2,2'-disulfonate in 40 ml. of distilled water. The mixture obtained, which contains starch and brightener, has a pH of 5.5–6.0.

The surface of sized printing paper is coated with this liquor in a sizing press and the coated paper is dried at about 50–120° in the drying compartment of the paper machine. In this way paper of considerably improved whiteness is obtained.

Instead of sized paper, sized cardboard can also be used successfully.

EXAMPLE 36

60 g. of the degraded starch used in the preceding example, are stirred into 600 ml. of cold water and then stirred at 80–90° to obtain a colloidal solution. 3 g. of sodium tri-polyphosphate, 0.3 g. of sodium hydroxide, 120 g. of styrene/butadiene copolymer latex having a solids content of 48%, a pH of 9.5, a specific gravity, at 25°, of 1.003, a specific gravity of the solids portion, at 25°, of 1.008, and a viscosity of 40 cps. determined according to Brookfield at 50 r.p.m. [e.g. Dow Latex 636], a solution of 4 g. of the optical brightener described in Example 4 in 400 ml. of water and, finally, 600 g. of an aluminum-magnesium silicate white pigment (China clay) are added to this solution and the whole is stirred until a homogeneous suspension is obtained.

A sized paper consisting of 50% each of bleached sulfite cellulose and ground wood pulp and having a surface pH of 4 is coated in a trailing blade coater with the liquor described above. A very beautiful white paper fast to printing and writing is obtained which can be used e.g. in offset printing.

Moreover an even greater amount of brightener, e.g. 8 g. instead of 4 g., does not cause undesirable discoloration but a further increase of the white effect.

The above-given physical data of the latex and the chemical constitution on which they depend are not critical. Any latices commercially available for use in the surface coating of paper can be employed in the above examples with similar success.

EXAMPLE 37

3.5 g. of the optical brightener given in Example 4 are dissolved in 40 ml. of distilled water. 1000 ml. of an aqueous coating liquor containing the following components are added to the solution:

45 g. of a commercial casein,
70 g. of the styrene/butadiene latex used in the preceding example,
2 g. of sodium tripolyphosphate,
0.2 g. of sulfated dodecyl alcohol polyglycol ether having 15 ethylene oxide groups,
400 g. of China clay, and
12 ml. of concentrated ammonia.

The pH of this dispersion is about 9.0.

The surface of sized paper is coated with this liquor in the sizing press. An extraordinarily white coated paper is obtained.

EXAMPLE 38

A synthetic resin coating liquor is prepared as follows:

A solution of 5 g. of the brightener described in Example 4 in 300 ml. of water and 2 g. of nonyl phenol pentadecaglycol ether is added to 140 ml. of an aqueous 50% dispersion of a thermally cross-linkable emulsion copolymer of methyl acrylate/methyl methacrylate styrene (monomer weight ratio 2:2:1), which dispersion has a pH value of about 9, a viscosity (measured according to Epprecht, A III, 25) of about 30–35 centipoise and a density of 1.035 g./ml. (e.g. commercially available Acronal S320D). The whole is diluted to 1000 ml. with water and well mixed.

Sized and filled sulfite cellulose crude paper is coated with this liquor and then dried. A brilliant white paper fast to printing and writing is obtained.

EXAMPLE 39

10 mg. of the brightener described in Example 1 dissolved in 10 ml. of water is added to a cellulose fiber suspension which is prepared from 5 g. of bleached sulfite cellulose, 150 ml. of water containing 0.4 g. of aluminum sulfate, and the whole is well mixed for 15 minutes. Then 0.75 ml. of a 10% aqueous resin sizing solution and subsequently 1.5 ml. of a 10% aqueous aluminum sulfate solution are added, the whole is diluted to 1000 ml. with water, made into paper sheets, pressed and dried. A paper having a brilliant white appearance is obtained.

It will be seen from this example that the brighteners according to the invention can be used at very low pH values for the brightening of paper pulp. Such conditions occur when strong backwater, i.e. a back water containing alum, is used for the production of paper.

Similar results are obtained if, with otherwise the same conditions, one of the brighteners mentioned in Examples 2–27 is used instead of that mentioned above and/or if the cellulose fiber suspension contains in lieu of aluminum sulfate an equivalent amount of alum.

EXAMPLE 40

100 g. of chemically pre-bleached cotton poplin fabric are treated for 15 minutes at 40° in a bath consisting of 3000 ml. of water, 6 g. of sodium sulfate and 0.3 g. of the brightener mentioned in Example 3. The goods are then rinsed with cold water and dried. The fabric so treated has a brilliant white appearance.

EXAMPLE 41

Cotton poplin fabric which has been previously cleaned and bleached in the usual way is impregnated at 20° in a padding machine with an aqueous finishing liquor which contains per liter 3 g. of the brightener obtained according to Example 1. The fabric is passed through the machine at the rate of 80 meters per minute. The impregnated goods are squeezed out to a liquor content of 70% calculated on the dry weight of the fabric and then dried immediately on a pin stenter for 10–20 seconds at a temperature of 140–150°.

Cotton poplin fabric brightened by this process has a very high, brilliant brightening effect, which is fast to acid and has a neutral shade.

Equally good results are obtained if, with otherwise the same procedure, the same amount of one of the brighteners described in Examples 2, 4, 7, 11, 12, 15, 18, 19, 20, 26, 29 or 30 is used.

EXAMPLE 42

Cotton fabric which has previously been cleaned and bleached in the usual way is impregnated in a padding machine with a finishing liquor of 20° which contains the following components per liter:

160 g. of dimethylol hydroxypropylene urea,
3 g. of optical brightener according to Example 1,
4 g. of hydrochloric acid (concentrated, 35%),
8 g. of o-phosphoric acid (85%), and
8 g. of maleic acid.

The pH of this finishing liquor is 1.4. The impregnated goods are squeezed out to a liquor content of 70% calculated on the dry weight of the fabric and are then dried to a moisture content of 5% of a pin stenter, rolled up, packed in polyethylene and stored for 12–18 hours at room temperature.

The goods which have been moist cross-linked in this way are rinsed in an open width washing machine, neutralized, and dried on a pin stenter. The fabric which has a wash-fast, anticrease finish has a very high, neutral white shade.

Equally good results are obtained if, with otherwise the same procedure, instead of the brighter mentioned above, the same amount of any of the brighters given in Examples 2, 7, 11, 12, 15, 18, 19, 20, 23, 26, 29, 30, 31 or 32 is used.

EXAMPLE 43

Cotton fabric which has previously been cleaned and bleached by the usual methods is impregnated in a padding machine with a finishing liquor of 20° which contains, per liter, the following components:

200 g. of dimethylol propylene urea, 100%,
4 g. of optical brightener according to Example 2, and
12 g. of concentrated hydrochloric acid (35%).

The pH of this finishing bath is 1.1. The impregnated goods are squeezed out to a liquor content of 70% calculated on the dry weight of the fabric and then dried on a pin stenter to a moisture content of 6–8%, rolled up, packed in polyethylene and stored for 12–18 hours at room temperature.

The fabric which has been moist cross-linked in this way is rinsed in an open width washing machine, neutralized, and dried on a pin stenter. The goods which have been brightened and finished by this moist cross-linkage process have a high degree of whiteness of a neutral shade and wash-and-wear properties.

Similar white effects are obtained if, with otherwise the same procedure, instead of the brightener mentioned, the same amount of one of the brighteners given in Examples 1, 7, 11, 12, 15, 18, 19, 20 or 23 is used.

EXAMPLE 44

100 g. of synthetic detergent consisting of 15.2 g. of sodium dodecylbenzene sulfonate,
3.8 g. of sodium salt of lauryl alcohol sulfuric acid ester,
25.6 g. of sodium polyphosphate,
7.6 g. of tetrasodium pyrophosphate,
4.8 g. of waterglass (sodium silicate),
1.9 g. of magnesium silicate,
5.0 g. of sodium carbonate,
1.4 g. of carboxymethyl cellulose,
0.3 g. of tetrasodium salt of ethylenediamine tetra-acetic acid, and
34.4 g. of sodium sulfate, are stirred into a homogeneous slurry of 100 g. of water. 0.11 g. of sodium 4,4′-bis-[4″,6″-diphenylamino-1″,3″,5″-triazinyl-(2″)-amino]-stillbene-2,2′-disulfonate and 0.17 g. of the brightener obtained according to Example 4 are added, the whole is well mixed and then dried in a spray-tower.

Uncolored cotton fabrics are washed for 15 minutes at 55° in a liquor containing 4 g. per liter of the brightener-containing detergent described above (liquor ratio 1:30). The goods are then rinsed and dried. The same washing liquor is used in the same way for two further washings. Beautifully brightened cotton goods are obtained by all three washings.

EXAMPLE 45

10 g. of a nylon staple fiber fabric are gently agitated for 30 minutes at a temperature of 90–92° in 300 ml. of an aqueous liquor which contains 0.5 ml. of formic acid and 0.025 g. of the brightener described in Example 1. After rinsing and drying, the fabric so treated has a brilliant white shade.

We claim:
1. A compound of the formula:

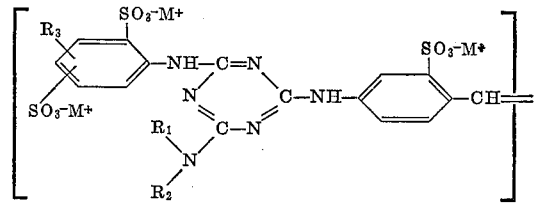

wherein:

$R_1$ represents hydrogen, lower alkyl, alkoxyalkyl of from 3 to 8 carbon atoms, alkylamino alkyl of from 3 to 8 carbon atoms, each of the last mentioned three members substituted by hydroxy or lower alkoxy, cycloalkyl of from 5 to 6 carbon atoms, lower alkyl-cycloalkyl of a total of from 6 to 12 carbon atoms, phenyl, or phenyl bearing a substitution selected from lower alkyl, lower alkoxy or halogen of an atomic number of at most 35, $R_2$ represents hydrogen, lower alkyl, alkoxyalkyl of from 3 to 8 carbon atoms, or each of the latter two members substituted by hydroxy or by lower alkoxy, or
$R_1$ and $R_2$ taken together with the nitrogen atom to which they are linked represent pyrrolidino, piperidino, hexamethyleneimino or morpholino or each of these members substituted by alkyl of at most 3 carbon atoms,
$R_3$ represents hydrogen, chlorine or bromine, and
$M^+$ represents hydrogen, alkali metal, alkaline earth metal, ammonium, hydroxy-lower alkyl-substituted ammonium or aluminum ion.

2. A compound as defined in claim 1, wherein $R_3$ represents hydrogen and the second group $-SO_3^-M^+$ is in 5-position.

3. A compound as defined in claim 2, wherein each of $R_1$ and $R_2$ represents hydrogen, lower alkyl, alkoxy-alkyl of from 3 to 8 carbon atoms or each of the latter two members substituted by hydroxy or lower alkoxy, or $R_1$ and $R_2$ taken together with the nitrogen atom to which they are linked represent pyrrolidino, piperidino, hexamethyleneimino or morpholino or each of these members substituted by alkyl of at most 3 carbon atoms.

4. A compound as defined in claim 3, wherein $R_1$ represents hydrogen and $R_2$ represents ethyl.

5. A compound as defined in claim 3, wherein each of $R_1$ and $R_2$ represents ethyl.

6. A compond as defiined in claim 3, wherein the grouping

represents piperidino.

7. A compound as defined in claim 3, wherein $R_1$ represents hydrogen and $R_2$ represents β-hydroxy-propyl.

8. A compound as defined in claim 3, wherein the grouping

represents morpholino.

9. A compound as defined in claim 3, wherein each of $R_1$ and $R_2$ represents methyl.

10. A compound as defined in claim 3, wherein $R_1$ represents methyl and $R_2$ represents ethyl.

11. A compound as defined in claim 3, wherein the grouping

represents hexamethyleneimino.

References Cited

UNITED STATES PATENTS

| | | | |
|---|---|---|---|
| 2,945,762 | 7/1960 | Carroll et al. | 260—240 XR |
| 3,239,513 | 3/1966 | Hausermann | 260—240 |

FOREIGN PATENTS 1,388,476  12/1964  France.

OTHER REFERENCES

Hausermann et al., Textil-Rundschau, vol. 16, pp. 176 to 180 (1961).

Yabe et al., J. Chem. Soc. Japan, vol. 60, pp. 604 to 611 (1957).

JOHN D. RANDOLPH, Primary Examiner

U.S. Cl. X.R.

117—33.5; 162—162; 252—135, 152, 301.2; 260—249.5, 249.8